United States Patent
Visinoni et al.

(10) Patent No.: US 8,901,471 B2
(45) Date of Patent: Dec. 2, 2014

(54) MICROWAVE INTEGRATED SOXHLET

(75) Inventors: Francesco Visinoni, Mozzo (IT); Camillo Pirola, Presezzo (IT)

(73) Assignee: Milestone S.R.L. (IT)

( * ) Notice: Subject to any disclaimer, the term of this patent is extended or adjusted under 35 U.S.C. 154(b) by 918 days.

(21) Appl. No.: 13/074,146

(22) Filed: Mar. 29, 2011

(65) Prior Publication Data

US 2011/0233203 A1    Sep. 29, 2011

(30) Foreign Application Priority Data

Mar. 29, 2010   (EP) .................................. 10425097

(51) Int. Cl.
| | | |
|---|---|---|
| H05B 6/64 | (2006.01) | |
| H05B 6/80 | (2006.01) | |
| C11B 1/10 | (2006.01) | |
| B01D 11/02 | (2006.01) | |
| A23L 1/00 | (2006.01) | |
| A23L 1/025 | (2006.01) | |

(52) U.S. Cl.
CPC ............... B01D 11/0211 (2013.01); A23L 1/00 (2013.01); A23L 1/0255 (2013.01)
USPC ............................. 219/756; 219/679; 554/21

(58) Field of Classification Search
CPC .... A23L 1/00; A23L 1/0255; B01D 11/0211; B01D 11/0296
USPC .......... 219/756, 679; 166/258, 261, 275, 401, 166/245, 272.6, 303, 302; 422/269, 280, 422/284; 585/240; 554/21
See application file for complete search history.

(56) References Cited

U.S. PATENT DOCUMENTS

| | | | |
|---|---|---|---|
| 5,114,567 A | | 5/1992 | DiFoggio |
| 5,291,145 A | * | 3/1994 | Yajima et al. ..................... 330/4 |
| 5,711,857 A | | 1/1998 | Armstrong |
| 2011/0308801 A1 | * | 12/2011 | Dana ............................. 166/302 |

FOREIGN PATENT DOCUMENTS

| | | |
|---|---|---|
| DE | 10118768 | 10/2002 |
| EP | 1439218 | 1/2003 |
| EP | 1439218 | 7/2004 |
| EP | 1955748 | 1/2007 |
| EP | 1955748 | 8/2008 |

* cited by examiner

Primary Examiner — Quang Van
(74) Attorney, Agent, or Firm — Fish & Tsang LLP

(57) ABSTRACT

A device for the extraction of a compound from a solid material, which includes a microwave unit enclosing an inner vessel that is configured to hold a solid and that is fluidly sealed within an outer vessel configured to hold a solvent to be vaporized, and a condenser that is arranged to condense the vaporized solvent and deliver the condensed solvent to the inner vessel is described. The inner vessel has a solvent outlet configured to deliver condensed solvent that contains an extracted compound back to the outer vessel. The device includes a stirrer within the outer vessel and a stirrer within the inner vessel to provide agitation during the extraction process.

20 Claims, 2 Drawing Sheets

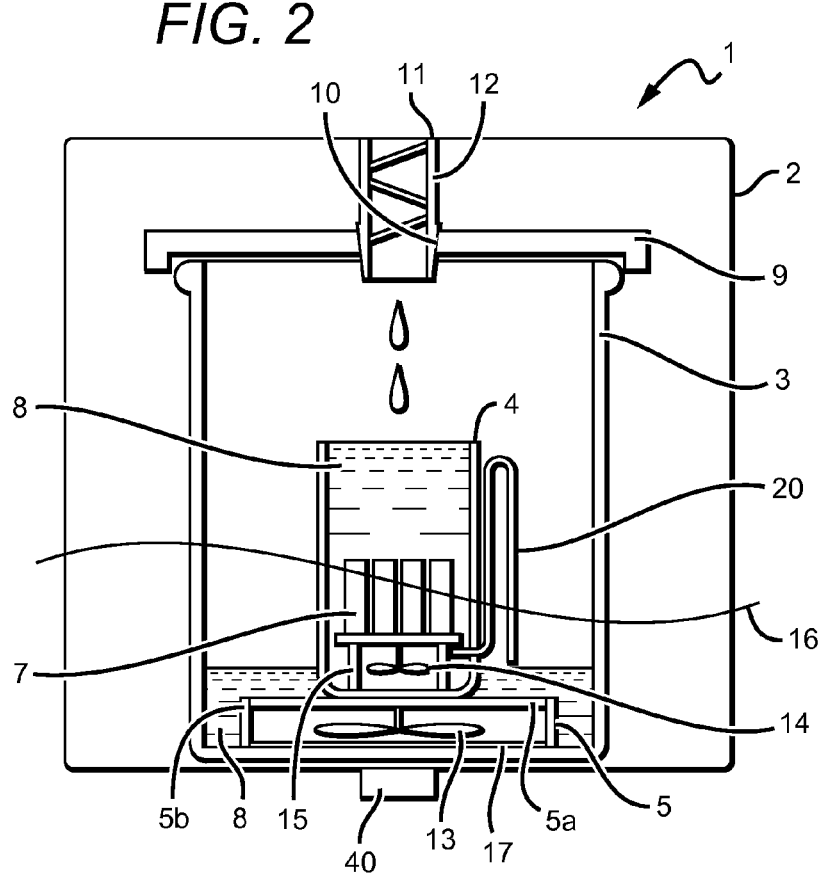
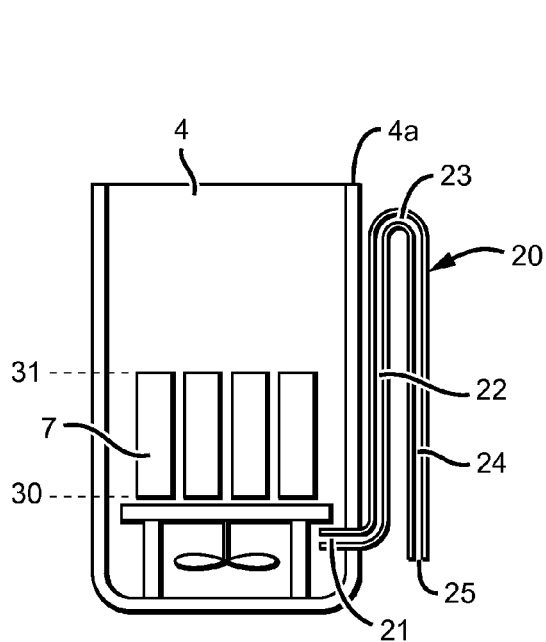
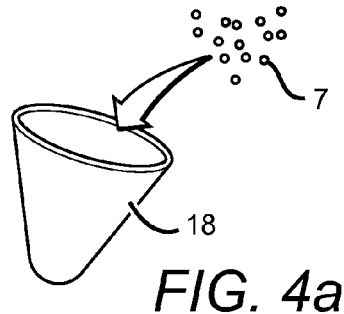
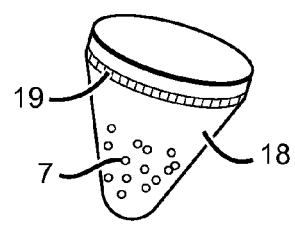

MICROWAVE INTEGRATED SOXHLET

This application claims priority to European Patent Application 10 425 097.2 filed Mar. 29, 2010. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The present invention relates to a method for the extraction of compounds from solid material and to a device for carrying out said method. In particular, the present invention is concerned with the extraction by microwaves based on the soxhlet extraction principle.

BACKGROUND

Extraction of solid material is traditionally performed by standard techniques such as a soxhlet extraction. The soxhlet method proceeds by iterative percolation of the sample to be extracted with recondensed vapors of solvent. This method is one of the most used techniques for extraction. Since this process can be quite lengthy, new methods using microwave radiation have been developed.

A fast extraction is specifically of interest if the amount of a specific compound, for example fat, within solid material, for example within food or other materials, has to be determined. So far, even when using microwave-assisted extraction, a fast extraction still is difficult.

The prior art methods are therefore limited in terms of efficiency and rapidity.

In view of the above, there is thus a need to provide an improved microwave-assisted extraction process which overcomes at least some limitations of the known processes.

SUMMARY OF THE INVENTION

Accordingly, this object is achieved by means of the features of the independent claims. The dependent claims develop further the central idea of the invention.

A first embodiment of the present invention relates to a device suitable for the extraction of a compound from a solid material by microwave irradiation, comprises: (1) a microwave unit; (2) an inner vessel housed and fluidly sealed within an outer vessel, the inner and outer vessels enclosed within the microwave unit, wherein the outer vessel is configured to hold a solvent to be vaporized and the inner vessel is configured to hold the solid material; (3) a condenser comprising an upper portion disposed outside of the microwave unit and a lower portion extending within the microwave unit an coupled to a cover that is configured to fluidly seal the outer vessel, wherein the condenser receives the vaporized solvent and delivers a condensed solvent to the inner vessel for extracting the compound from the solid material; (4) the inner vessel further comprising a solvent outlet configured to deliver the condensed solvent containing an extracted compound back to the outer vessel; and (5) a first stirrer within the outer vessel and a second stirrer within the inner vessel for agitating the solvent within the inner and outer vessels during the extraction process.

A second embodiment of the present invention relates to a method for the extraction of a compound from a solid material, comprising the steps of: (1) placing the solid material to be extracted in an inner vessel housed within an outer vessel; (2) placing a quantity of a solvent in the outer vessel and the inner vessel, wherein the quantity of solvent in the inner vessel surrounds the solid material; (3) subjecting the outer and inner vessels to microwave irradiation, the microwave irradiation causing at least partial vaporization of the solvent within the outer vessel; (4) condensing the vaporized solvent in a condenser and delivering a condensed solvent to the inner vessel for extracting the compound from the solid material; (5) transferring the solvent in the inner vessel containing the extracted compound to the outer vessel; and (6) agitating the solvent within the inner and outer vessels with first and second stirrers.

BRIEF DESCRIPTION OF THE DRAWING

The present invention is further described hereinafter with reference to some of its embodiments shown in the accompanying drawings in which:

FIGS. 4a and 4b depict a container for the solid material to be extracted.

DETAILED DESCRIPTION

Figure 1:
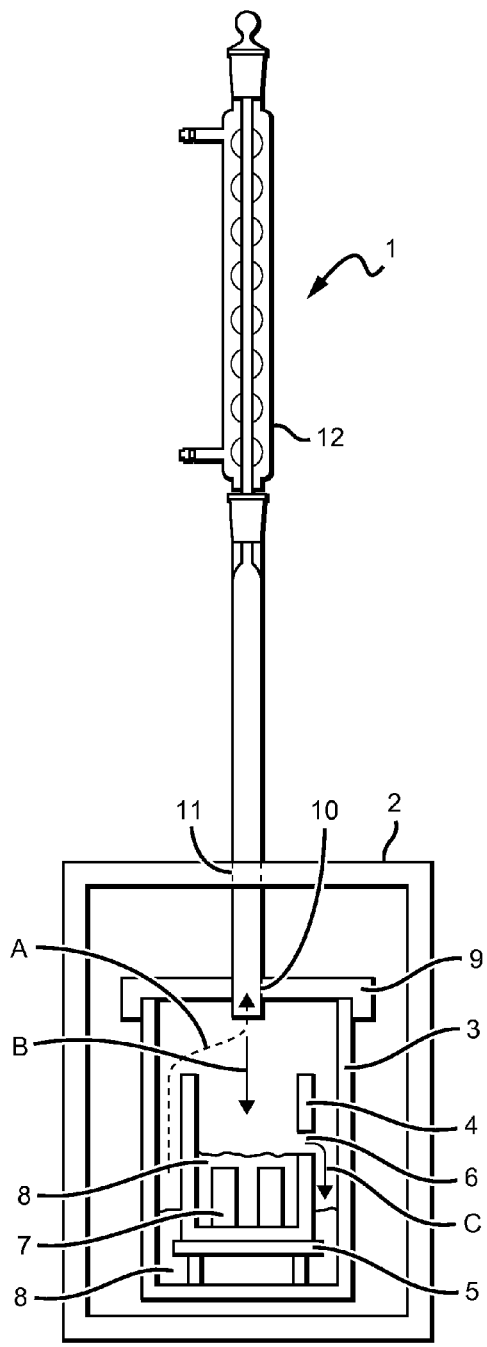
FIG. 1 depicts a schematic overview of a device according to the present invention, FIG. 2 schematically depicts a part of a device according to the present invention, FIG. 3 schematically depicts an inner vessel as used within a preferred embodiment of the present invention.

Referring to FIG. 1 the device suitable for carrying out the method of the present invention is schematically shown. However, with reference to FIG. 1 the general principle underlying the present invention will be explained. It is to be noted that several components of the present invention in FIG. 1 are omitted for the sake of clarity.

The device 1 according to the present invention comprises a microwave unit 2.

The microwave unit 2 is preferably a multi-mode laboratory grade microwave unit with a maximum delivered power of 1000 watt variable in 10 watt increments. The microwave unit 2 may be any microwave used commonly in the art. For instance, it may be a Milestone ETHOS microwave oven or a Milestone NEOS microwave oven.

A first outer vessel 3 is placed in the microwave unit 2. Into the outer vessel 3 a second inner vessel 4 is placed, which is smaller than the outer vessel in height and diameter. Preferably, the inner vessel 4 is placed onto a support 5 within the outer vessel 3 at a defined distance from the bottom of the outer vessel 3.

The outer vessel 3 and the inner vessel 4 preferably are made out of a material which poorly absorbs microwave radiation and does not hinder the propagation of microwaves. Preferably, the outer vessel 3 and the inner vessel 4 are traditional glass beaker-type flat bottom containers.

The inner vessel 4 additionally comprises an outlet 6 for delivering solvent 8 from the inner vessel 4 into the outer vessel 3. The outlet 6 preferably is provided within a sidewall of the inner vessel 4.

The solid material 7 to be extracted is placed into the inner vessel 4. The solid material 7 can be placed directly into the inner vessel 4 or, according to a preferred embodiment, the solid material 7 is filled into a container, which in turn is placed into the inner vessel 4.

A solvent 8 is filled into the outer vessel 3. Preferably, only a part of the solvent when starting the extraction process is filled into the outer vessel 3 and the rest of the solvent is filled into the inner vessel 4.

A cover 9 is placed on top of the outer vessel 3. The cover 9 comprises a first opening 10 and the microwave unit 2 on its top comprises a second opening 11. Through the second opening 11 and the first opening 10 the lower portion of a condenser 12 is inserted. The microwave unit 2 hereby has a large port in the upper part for introducing the reflux adapter of the condenser 12. The connection between the condenser 12 and the first opening 10 as well as the connection between the cover 9 and the outer vessel 3 is air tight in order to ensure a closed loop, i.e. to avoid that solvent 8 or vapors of solvent 8 are leaving the circulation path between outer vessel 3, condenser 12 and inner vessel 4.

With reference to FIG. 1 now the circulation of the solvent 8 will be explained. The circulation path in FIG. 1 is indicated by arrows A, B and C. With the presented circulation path of solvent 8, a compound is extracted from the solid material 7 within the inner vessel 4.

Due to the microwave radiation the solvent 8 within the outer vessel 3 is heated so that fresh solvent not containing the extracted compound is vaporized and as shown by arrow A ascends into the condenser 12. In the condenser 12 the fresh vaporized solvent is condensed and the condensed fresh solvent as shown by arrow B drops down into the inner vessel 4. Within the inner vessel 4 then the fresh solvent 8 surrounds the solid material 7 and extracts the compound to be extracted. When the solvent 8 within the inner vessel 4 reaches a predefined level, whereby the level depends on the type and/or position of the outlet 6, solvent 8 containing the extracted compound as shown by arrow C will be delivered from the inner vessel 4 back into the outer vessel 3. The circulation then starts again, whereby from the outer vessel 3 only the solvent 8 without extracted compound is vaporized, so that fresh solvent is constantly delivered into the inner vessel 4. The extracted compound remains within the outer vessel 3.

FIG. 2 depicts an enlarged view on the device 1 according to a preferred embodiment of the present invention.

According to the present invention, a first stirrer 13 is provided within the outer vessel 3 and a second stirrer 14 is provided within the inner vessel 4. With these two stirrers 13, 14 the solvent 8 within each of the vessels 3, 4 is constantly agitated. This results in the effect that fresh solvent 8 within the inner vessel 4 is always present in the vicinity of the solid material 7 to be extracted. Further, the temperature of the solvent 8 in the outer vessel 3 and the inner vessel 4, respectively, is kept at a homogeneous value. Additionally, by use of the first stirrer 13 within the outer vessel 3, the vaporization of fresh solvent is supported.

The first stirrer 13 and the second stirrer 14 can be any conventional type of non microwave absorbing stirrers adapted to constantly agitate the solvent 8 within the vessels. The stirrers can be lying loosely on the bottom of the respective vessel or they can be attached to an appropriate part of the vessel or any other object within the vessel. Preferably, the stirrers are magnetic-type non microwave absorbing stirrers.

In a preferred embodiment, the first stirrer 13 within the outer vessel 3 is attached to the support 5. Preferably, the first stirrer 13 is provided within the center of the outer vessel 3, so that an even agitation of the solvent 8 within the outer vessel 3 is achieved. The support 5 hereby comprises a base plate 5a onto which the inner vessel 4 is placed. The base plate 5a can partially or completely cover the surface area delimited by a horizontal plane of the outer vessel 3. The support further comprises a plurality of legs 5b, so that the base plate 5a has a predefined distance from the bottom of the outer vessel 3 and so that a space is provided between the bottom of the outer vessel 3 and the base plate 5a. The first stirrer 13 is attached to the base plate 5a and is moving in the space provided between the base plate 5a and the bottom of the outer vessel 3.

Likewise, within the inner vessel 4, a material support can be 15 is provided, onto which the solid material 7 to be extracted is placed and to which the second stirrer 14 is attached in the same manner as the first stirrer 13 to the support 5. The material support 15 can have the same shape as the support 5 and can partially or completely cover the surface area delimited by a horizontal plane of the inner vessel 4.

By attaching the stirrer to the vessel itself or to a support within the vessel, the position of the stirrer can be fixed during the extraction process. Preferably, each stirrer is placed within the center of the respective vessel and kept by appropriate means at this position, so that throughout the whole extraction process an evenly distributed agitation of the solvent 8 within both vessels becomes possible.

The first stirrer 13 and the second stirrer 14 preferably are magnetic stirrers, which are agitated by a common magnetic motor 40, provided below the microwave unit 2 or within the bottom of the microwave unit 2.

If necessary, within the inner vessel 4 and/or the outer vessel 3, additional components can be placed to displace the solvent 8, in case that a necessary height of the solvent 8 within the respective vessel without such additional component would not be reached.

The cover 9, the support 5, the material support 15 and above mentioned additional components preferably are made out of a material which does not absorb microwave radiation. Preferably, these components are made out of glass or microwave transparent polymers like polypropylene (PP), polyethylene (PE), polytetrafluoroethylene (PTFE, also known under Teflon®), perfluoroalkoxy (PFA) or any combinations thereof.

With the present invention (based on the Soxhlet principle), which uses microwave radiation for heating the solvent and a stirrer within each of the vessels, a very fast and effective extraction is achieved, as will be explained in the following. Thereby, the advantages of the present invention will become evident.

Generally, at the surface of the solid material 7, an equilibrium is formed between the percentage of compound to be extracted within the solid material 7 and the percentage of compound already dissolved within the solvent 8. If no fresh solvent is delivered to the surface of the solid material 7, due to the equilibrium, the extraction process would stop. By constantly providing a flow of fresh solvent 8 to the solid material 7, the extraction is kept going on. With the present invention by constantly agitating the solvent 8 through the second stirrer 14 within the inner vessel 4, a continuous flow of fresh solvent 8 around the solid material 7 is achieved, so that the extraction becomes very efficient.

Further, due to the stirrers within both vessels, the temperatures of the solvent 8 within both vessels is also kept uniform, which assures a fast extraction.

With the use of microwave radiation, a faster and more uniform heating of the solvent 8 within the outer vessel 3 is achieved, so that the speed of the extraction is further supported.

Due to the fast heating, the constant flow of fresh solvent and the homogeneous temperature, the present invention enables a very fast and effective extraction.

The solvent 8 is heated either directly or indirectly by microwave radiation 16 schematically indicated in FIG. 2. A solvent which is heated directly by microwaves can be any solvent selected from polar solvents such as water, methanol, ethanol etc. Alternatively, a non-polar solvent selected from hexane, cyclohexane, limonene etc. can be used. More specifically, the solvent can be any one of the following solvents, whereby in the following listing the solvents are listed from high to low polarity: ethylene glycol, ethanol, DMSO, 2-propanol, formic acid, methanol, nitrobenzene, 1-butanol, 2-butanol, 1,2-dichlorobenzene, NMP, Acetic acid, DMF, 1,2-dichloroethane, water, chlorobenzene, chloroform, acetonitrile, ethyl acetate, tetrahydrofuran, dichloromethane, toluene, hexane or a combination thereof.

In case of non-polar solvents additionally a heating component 17 is provided within the outer vessel 3, which can be heated by microwave radiation 16 and thereby heats the solvent 8 into which it is placed. As heating component 17 for example a plate lying at the bottom of the outer vessel 3 can be used. Alternatively, several heating particles of any shape can be used and placed within the solvent 8 within the outer vessel 3.

The heating component 17 preferably is made of a compound capable of absorbing microwaves. Such compound is typically a polytetrafluoroethylene/graphite or PTFE/carbon compound. Such material is for example known under the trade name of Weflon™. The use of such a compound allows diffusion of heat created by the microwaves to the surrounding solvent 8.

As already described with reference to FIG. 1, an outlet 6 is provided within the sidewall of the inner vessel 4, which allows solvent 8 to be delivered from the inner vessel 4 to the outer vessel 3. The outlet hereby in a first embodiment as shown in FIG. 1 can be provided as access flow valve, so that as soon as the height of the solvent 8 within the inner vessel 4 reaches the height of the outlet 6, solvent 8 constantly flows or drops from the inner vessel 4 into the outer vessel 3.

In a preferred embodiment as shown in FIG. 2 and FIG. 3, the outlet is a siphon 20. The shape and functionality of the siphon will be explained in detail with reference to FIG. 3.

The siphon has a functionality and shape of a conventional well known siphon and therefore is only briefly explained. As depicted in FIG. 3, siphon 20 has a first opening 21, which is integrated into the sidewall 4a of the inner vessel 4. From the first opening 21 a first longitudinal portion 22 extends along the sidewall 4a of the inner vessel 4, leads into a curve 23 and further into a second longitudinal portion 24 extending parallel to the first longitudinal portion 22. The second opening 25 is provided at the end of the second longitudinal portion 24.

Indicated in FIG. 3 are also the first height 30, at which the solid material 7 is placed within the inner vessel 4, and the second height 31 indication the maximum vertical extension of the solid material 7 within the inner vessel 4.

As soon as the solvent 8 reaches the height of the curve 23 of the siphon 20, a large amount of solvent 8 is emptied from the inner vessel 4 and delivered to the outer vessel 3. Solvent 8 flows from the inner vessel 4 through the siphon 20 to the outer vessel 3 until the height of the solvent 8 within the inner vessel 4 reaches the first opening 21 of the siphon. Then the flow of solvent 8 stops until the height again reaches the height of the curve 23 of the siphon.

In order to provide an effective extraction of the compound from the solid material 7, the first opening 21 of the siphon 20 is provided below the solid material 7, i.e. below the first height 30. Further, the height of the curve 23 is above the second height 31, i.e. above the solid material 7. In order to achieve this geometrical relationship, either a specific vessel with a corresponding siphon can be chosen and/or the height of the support 5 can be adapted accordingly.

The siphon principle has the effect that predominantly the fresh solvent 8 being condensed by the condenser 12 and flowing down from the condenser 12 into the inner vessel 4 comes into contact with the solid material 7. Since due to the siphon 20 a major part of the solvent 8 comprising already extracted compound is removed from the inner vessel 4, the percentage of extracted compound within the solvent 8 in the inner vessel 4 is kept at a low value so that the fast and effective extraction is further supported.

With reference to FIGS. 4a and 4b now further details of preparing the solid material 7 will be explained.

Preferably the solid material 7 is placed into a container 18, as shown in FIG. 4a. The container 18 as shown in FIG. 4b is sealed along a sealing line 19. The material support preferably comprises corresponding openings or recesses to receive a container 18 therein. The openings or recesses hereby can have a size large enough to allow the container 18 to be inserted but small enough to fixedly keep the container 18 therein through the extraction process.

Figure 5:
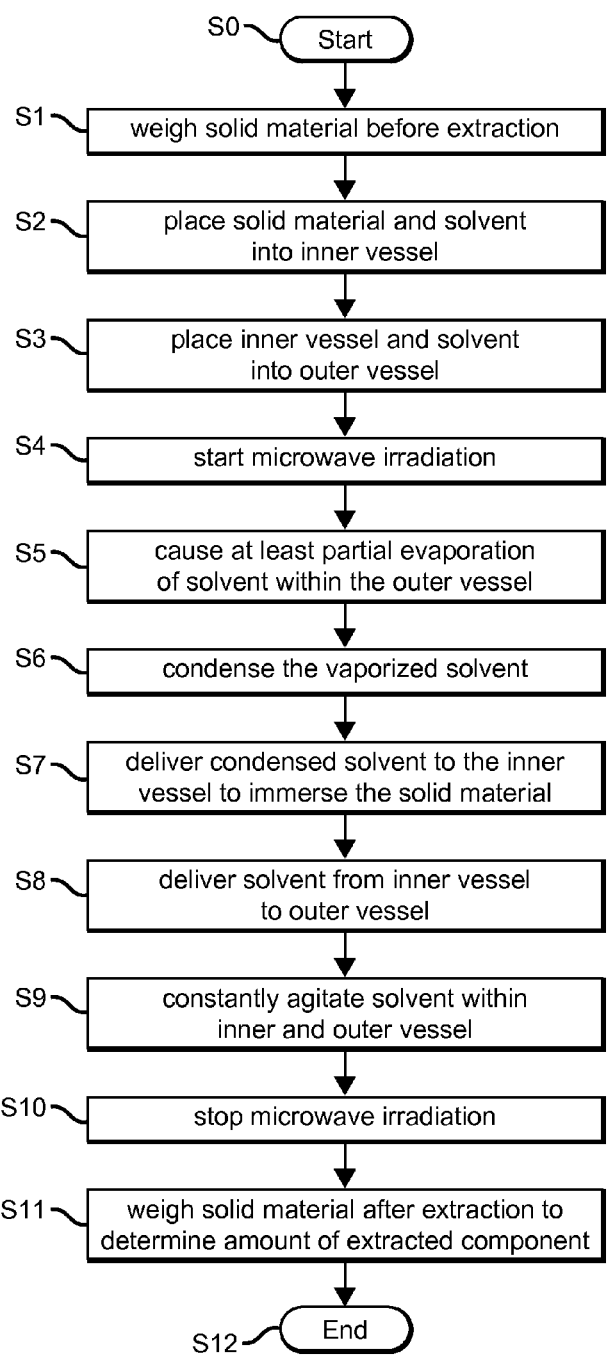
FIG. 5 is a flowchart showing schematically the process steps according to the method of the present invention.

Now with reference to FIG. 5 the steps of the method will be explained in more detail.

The process starts in step S0. In step S1 the solid material 7 to be extracted is weighed, placed in container 18, which is then sealed, and in step S2 is placed into the inner vessel 4 together with a part of the solvent 8. In step S3 the inner vessel and the solvent 8 are placed into the outer vessel 3.

In step S4 the microwave irradiation is started. In step S5 at least a part of the solvent within the outer vessel is caused to evaporate and to condense in step S6 within the condenser 12. In step S7 the condensed solvent 8 is delivered to the inner vessel 4 to surround and immerse the solid material 7, which preferably is contained within the sealed container 18. In step S8 solvent 8 is delivered from the inner vessel 4 to the outer vessel 3 via the outlet 6, which preferably is a siphon 20. The steps S5 to S8 are repeated until the complete compound is extracted from the solid material 7.

According to step S9, the solvent 8 within both vessels is constantly agitated, i.e. the solvent 8 is agitated during the steps S5 to S8.

After the extraction is complete, the microwave irradiation in step S10 is stopped.

In step S11 after a drying process the remaining solid material 7 is again weighed. By the difference in weight before and after extraction the amount of extracted compound can be determined.

The process ends in step S12.

The fact that the extracted compound is determined by said difference in weight has the advantage, that a plurality of different probes can be extracted at the same time, since the purity of the extracted compound is not important. According to the present invention preferably four probes are extracted at one time, but also larger number of probes up to 20 probes or more can be extracted.

Preferably, according to the present invention the extraction takes places at a constant temperature between 60° C. and 76° C. according to the boiling temperature of the solvent 8 and using a radiation power between 300 W and 1000 W, preferably of 400 W. The extraction duration is less than 20 minutes, preferably about 15 minutes.

Example I

The following is a detailed example with respect to the method of the present invention for extracting fat from food.

An amount of 1 to 2 gram of food is loaded into the container 18. Preferably as outer vessel 3 a flask with a volume of 2000 milliliters is used and as inner vessel 4 a flask with a volume of 600 milliliters is used. The complete volume of the solvent is 500 milliliters and the recycle volume using the siphon is 300 milliliters. The radiation power is set at 400 watt. The extraction using four containers 18 each comprising an amount of 1-2 gram of solid material is performed for 15 minutes. This duration is sufficient to completely extract the compound, for example fat, from the solid material.

Solid materials such as bakery products, sausage products, fried foods, cheese, milk, or the like can be used.

The advantages provided by the extraction device and process according to the present invention are numerous.

According to the present invention by using microwave radiation, a very fast and uniform heating of the solvent is reached. By further providing a stirrer in each of the vessels, the temperature within the solvent is homogeneously kept. Further, it is ensured that fresh solvent is always in contact with the solid material.

In a preferred embodiment a siphon is used to deliver solvent from the inner vessel to the outer vessel. Thereby it is ensured that when the inner vessel is refilled, the solid material comes in contact with only fresh solvent, so that the extraction process can be further accelerated.

What is claimed is:

1. A device suitable for the extraction of a compound from a solid material by microwave irradiation, comprising:
    a microwave unit;
    an inner vessel housed and fluidly sealed within an outer vessel, the inner and outer vessels enclosed within the microwave unit, wherein the outer vessel is configured to hold a solvent to be vaporized and the inner vessel is configured to hold the solid material;
    a condenser comprising an upper portion disposed outside of the microwave unit and a lower portion extending within the microwave unit an coupled to a cover that is configured to fluidly seal the outer vessel, wherein the condenser receives the vaporized solvent and delivers a condensed solvent to the inner vessel for extracting the compound from the solid material;
    the inner vessel further comprising a solvent outlet configured to deliver the condensed solvent containing an extracted compound back to the outer vessel; and
    a first stirrer within the outer vessel and a second stirrer within the inner vessel for agitating the solvent within the inner and outer vessels during the extraction process.

2. The device of claim 1, wherein the outer vessel further comprising a support for the inner vessel and wherein the inner vessel further comprises a material support adapted to receive the solid material.

3. The device of claim 2, wherein the first stirrer is coupled to the support of the outer vessel and wherein the second stirrer is coupled to the material support of the inner vessel.

4. The device of claim 1, wherein the solvent outlet is a siphon.

5. The device of claim 4, wherein the siphon further comprising a first opening in a sidewall of the inner vessel at a height below the solid material, and the siphon further comprises a curve at a height above the solid material.

6. The device of claim 1, wherein the cover further comprising a first opening for inserting the lower portion of the condenser and wherein a connection between the cover and the outer vessel and a connection between the cover and the lower portion of the condenser are airtight.

7. The device of claim 1, wherein each of the outer and inner vessels, the support and the material support are made of at least one of glass and polytetrafluoroethylene.

8. The device of claim 1, wherein the solvent is a polar solvent that is capable of being heated by microwave irradiation.

9. The device of claim 8, wherein the polar solvent is at least one of water, methanol and ethanol.

10. The device of claim 1, wherein the solvent is a non-polar solvent.

11. The device of claim 10, wherein the non-polar solvent is at least one hexane, cyclohexane and limonene.

12. The device of claim 1, wherein the outer vessel further comprises a heating component that is configured to be capable of being heated by microwave irradiation.

13. The device of claim 12, wherein the heating component comprises at least one of polytetrafluoroethylene/graphite or PTFE/carbon.

14. A method for the extraction of a compound from a solid material, comprising the steps of:
    placing the solid material to be extracted in an inner vessel housed within an outer vessel;
    placing a quantity of a solvent in the outer vessel and the inner vessel, wherein the quantity of solvent in the inner vessel surrounds the solid material;
    subjecting the outer and inner vessels to microwave irradiation, the microwave irradiation causing at least partial vaporization of the solvent within the outer vessel;
    condensing the vaporized solvent in a condenser and delivering a condensed solvent to the inner vessel for extracting the compound from the solid material;
    transferring the solvent in the inner vessel containing the extracted compound to the outer vessel; and
    agitating the solvent within the inner and outer vessels with first and second stirrers.

15. The method of claim 14, further comprising the steps of placing the solid material into a container, sealing the container and placing a plurality of such containers into the inner vessel.

16. The method of claim 14, further comprising the steps of using a radiation power between 300 W and 1000 W to reach a boiling point of the solvent, and provide a solvent temperature of between 60° C. and 80° C.

17. The method of claim 14, comprising the steps of siphoning the solvent in the inner vessel containing the extracted compound to the outer vessel.

18. The method of claim 14, wherein the solvent is selected from group consisting of polar and non-polar solvents.

19. The method of claim 14, further comprising the step of determining the amount of the compound within solid material, comprising the steps of weighing the solid material before extraction, extracting the compound according to the claimed method, and weighing the solid material after extraction to determine the amount of extracted compound.

20. The device of claim 1, wherein the first and second stirrers are magnetic microwave compatible stirrers and wherein the device further comprises a motor for magnetically driving the first and second stirrers.

* * * * *